United States Patent Office 3,544,668
Patented Dec. 1, 1970

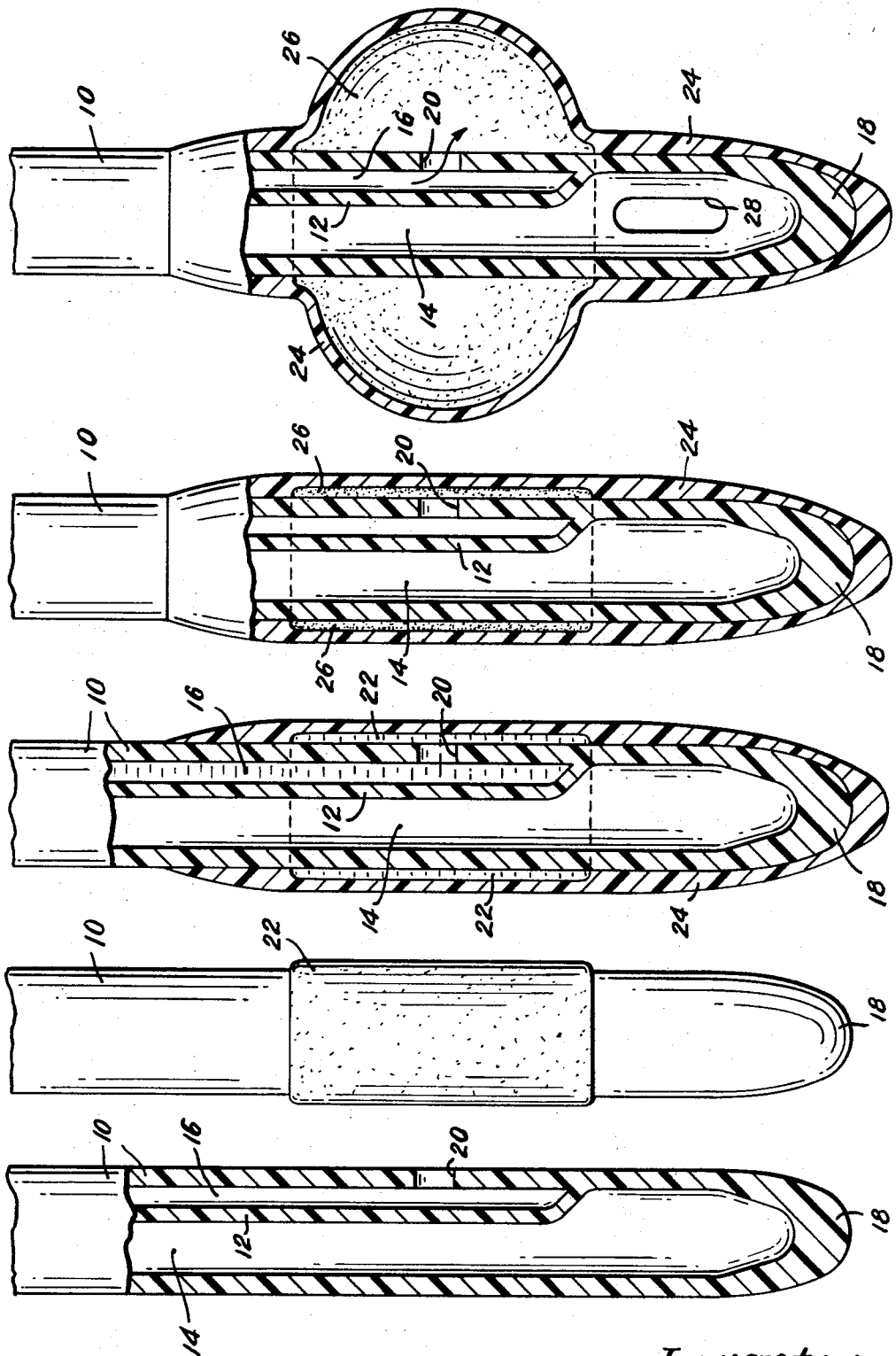

3,544,668
METHOD OF MANUFACTURING A
BALLOON CATHETER
Paul Dereniuk, Woonsocket, R.I., assignor to Davol Inc.,
Providence, R.I., a corporation of Rhode Island
Filed July 22, 1968, Ser. No. 746,355
Int. Cl. B29c 13/00; B32b 7/06, 31/26
U.S. Cl. 264—135          12 Claims

ABSTRACT OF THE DISCLOSURE

In the manufacture of balloon catheters for urethral retention, the catheter shaft is coated with a gel material, and the shaft and coating are then overdipped to form a skin which bonds to the shaft. But the gel is not dissolved by the overdip solution, and thus acts as a barrier preventing the skin from adhering to the shaft in the neighborhood of the gel. Later the gel is decomposed by drying, allowing the skin to be inflated as a retention balloon.

BACKGROUND OF THE INVENTION

This invention relates to methods for manufacturing urethral catheters having an inflatable retention balloon. It is particularly adapted for manufacturing such catheters entirely of plastic materials, but certain aspects of the invention also have utility in the manufacture of rubber catheters of the same type.

THE PRIOR ART

Balloon type urethral retention catheters have been in use for many years. These usually comprise a flexible and resilient shaft having elongated drainage and inflating lumens extending longitudinally therethrough. An opening in the catheter wall extends into communication with the inflating lumen, and an inflatable sac or balloon is secured to the catheter in overlying relationship to the inflating opening so that introduction of fluid pressure through the inflating lumen will cause the balloon to distend for uretharl retention. The distal end of the catheter is normally closed off and rounded, and a drainage eye is provided in the catheter wall in communication with the drainage lumen, the eye being located between the balloon and the distal end of the catheter. Catheters of this general type are illustrated in U.S. Pats. Nos. 2,248,934 and 2,308,484.

Catheters of the general type just described have been conventionally made of rubber, the usual manufacturing technique involving a series of latex dips, much in the manner described in U.S. Pat. No. 2,320,157, for example. Although rubber catheters of this type have given quite satisfactory service, it has been found that certain advantages are achieved by fabricating such catheters of a clear plastic material. More specifically, in urethral catheters fabricated of rubber, it has been found that after a certain period of usage there is a build-up of calcium salts in the drainage lumen of the catheter, which reduces the drainage capacity thereof, and in extreme cases might even occlude the catheter so as to prevent drainage completely. Catheters fabricated of a nontraumatic flexible, non-toxic plastic material function substantially as effectively as the conventional rubber catheter, but resist the build-up of calcium salts. This permits a smaller drainage lumen to be used, resulting in a catheter shaft of smaller outside diameter, which contributes to the comfort of the patient. In addition, with a catheter of clear plastic, the device can be visually inspected to insure that proper drainage is taking place in use.

SUMMARY AND OBJECTS OF THE INVENTION

It is a primary object of the present invention to provide a method of manufacturing plastic urethral retention catheters, the method however also having utility in the manufacture of rubber catheters as well.

One of the principal problems in the manufacture of catheters is the provision of suitable means for securing the inflatable sac or balloon to the catheter shaft so that the balloon is securely sealed to the shaft at either end, while at the same time its mid-section is free to distend when inflated. In addition, the outer surface of the catheter shaft and sac assembly must be substantially smooth and unobstructed to facilitate initial insertion of the catheter at the time of use. Accordingly, a specific object of the present invention is to provide a technique for securing an inflatable sac to a catheter shaft, in a manner which solves the foregoing problems.

A further object of the invention is the provision of a method for securing an inflatable sac to a catheter shaft, which is relatively simple and economical to employ and which results in an effective end product.

Previously, a number of different production methods have been tried for attaching an inflation sac to a catheter shaft. In one of these methods an aqueous water soluble partition material was coated on the catheter shaft in the neighborhood of the inflation eye. Then, the sac was formed by overdipping, i.e., immersing the tip of the catheter shaft and the partition material in a solution so that a film adheres to the catheter shaft and partition, and then dries to form a coating thereon. The coating ultimately formed will adhere to the catheter shaft above and below the balloon area, but will be separable from the catheter shaft for inflation purposes in the neighborhood of the partition, it being the function of the aqueous partition material to prevent the overdipped coating from adhering to the catheter shaft in this region. A disadvantage of this method is that the quality of the inflation sac thus formed could not be pre-tested at the factory by means of a simple air inflation procedure. The balloon was not normally inflated until the time for use arrived, at which time it was inflated with water so as to dissolve the aqueous partition material, thus permitting inflation of the sac.

Additional objects, features and advantages of the invention will become apparent from the following detailed description of a preferred and illustrative embodiment.

DESCRIPTION OF THE DRAWINGS

In the drawing which illustrates the best mode presently contemplated for carrying out the present invention:

FIG. 1 is an elevational view, with parts broken away and sectioned for clarity of illustration, of a plastic catheter shaft before the inflation sac or the drainage eye of the finished catheter has been formed;

FIG. 2 is an elevational view of the catheter shaft of FIG. 1 with a gel coating thereon in the neighborhood of the inflation eye;

FIG. 3 is an elevational view, with parts broken away and sectioned, of the catheter shaft and gel coating of the previous figures after an overdipping operation has been performed thereon;

FIG. 4 shows the overdipped catheter assembly of FIG. 3, after the gel coating has been decomposed; and FIG. 5 shows the same assembly as FIG. 4, but with the fully formed balloon thereof inflated by air pressure, and the drainage eye cut into the wall of the catheter shaft.

DESCRIPTION OF THE DRAWING

The manufacturing method described herein begins with the formation of a plastic catheter shaft 10. The manufacture of such catheter shafts is now conventional in the art, and generally involves extrusion of a polyvinyl chloride or polyurethane material to form the cylindrical tube 10 having an internal partition 12 which divides the interior of the catheter shaft 10 into a drainage lumen 14 and an inflation lumen 16. The extrusion process of course produces a cylindrical configuration, after which the distal tip 18 of the catheter shaft 10 is rounded and closed off by means of a conventional heat process. An inflation eye 20 is punched into the wall of the catheter shaft 10 nearer the distal end of the catheter, which eye communicates with the inflation lumen 16. This step must be done before the plastic inflation sac is formed, since the inflation eye 20 must ultimately be within the inflation sac.

The next step, illustrated in FIG. 2 is to apply a cylindrical coating 22 of a gel material completely around the outer surface of the plastic catheter shaft 10, from a point somewhat above the inflation eye 20 to a point somewhat below it. The gel material is relatively viscous, and can therefore be applied by means of a brush or in any other convenient way, after which it will remain in a self-supporting manner upon the surface of the catheter shaft, without spreading out into a thin film and without draining off as a less viscous liquid might do.

A typical gel material for the coating 22 comprises a solid gelling agent, a liquid constituent which is either a solvent for the gelling agent or forms a colloidal dispersion therewith, and possibly an anti-block such as glycerine. The gel viscosity depends upon the pH of the material, the viscosity decreasing with greater acidity. Therefore, in order to achieve sufficient viscosity to prevent the gel from dripping or spreading, the material must be at least partially neutralized with an alkali material, although the latter need not be part of the gel formulation, as will be explained below. Examples of gelling agents which can be used are the B. F. Goodrich Chemical Co.'s Carbopol brand water-soluble resin, the Du Pont Co.'s Baymal brand colloidal alumina (boehmite) A100H, the Dow Chemical Co.'s Methocel brand of methyl cellulose, and aluminum stearate. Examples of liquids which serve as solvents or form colloidal dispersions, according to the particular choice of gelling agent and liquid, are water, possibly mixed with glycerine, toluene, a mixture of toluene and alcohol, and methylene chloride. Examples of alkali neutralizing agents are ammonium hydroxide and volatile amines.

The next step in the process, as illustrated in FIG. 3, is to form a plastic skin 24 over the gel coating 22 and over the adjacent surfaces of the catheter shaft 10. This is done by a process of overdipping; i.e., immersing the lower tip of the catheter shaft 10, including the gel coating 22, in a solution of a plastic material. When the catheter shaft and its associated gel coating 22 are removed from the solution, a liquid film of plastic solution 24 adheres to the previously immersed portions of the catheter shaft and to the gel coating. This thin film of plastic solution then dries to form the plastic skin 24 over the gel coating and over the entire lower tip of the catheter shaft 10. Several dips are performed, with time allowed in between for the solvent liquid of the overdipping solution to dry out. Thus, the skin 24 is built up in layers until it reaches the desired thickness. Ultimately, the plastic skin 24, in the region of the gel coating 22, forms the inflation balloon of the completed catheter.

During the overdipping operation, it is the function of the gel coating 22 to remain in place upon the catheter shaft 10, and to maintain its film thickness and its physical integrity, without spreading or dripping or being dissolved or physically washed away by the overdipping solution. Thus the gel coating 22 persists as a physical barrier separating the film of plastic solution (and the plastic skin 24 which the latter ultimately forms) from the underlying surface of the catheter shaft 10 in the region surrounding the inflation eye 20. The ultimate objective is to keep the plastic skin 24 free of the surface of the catheter shaft 10 in the region occupied by the gel coating 22, so that the plastic skin 24 can later be distended away from the surface of the catheter shaft 10 by air pressure for the purposes of inflating the urethral retention balloon. On the other hand, in the regions above and below the gel coating 22, it is intended that the plastic skin 24 adhere strongly to, or become integral with, the plastic catheter shaft 10 so that the balloon is tightly secured thereto.

In view of these objectives, the composition of the overdipping solution which forms the plastic skin 24 is of some importance in relation to the nature of the gel coating 22. In the manufacture of all-plastic catheters, it is conventional to employ a solution of the B. F. Goodrich Company's Estane brand polyurethane plastic dissolved in a suitable liquid employing tetrahydrofuran as the principal solvent material. Such an overdipping solution is a preferred material for the present method, but other overdipping solutions with the necessary properties in relation to the material of the catheter shaft 10 and the gel coating 22 may also be used. The important feature is that the solvent of the overdipping solution which forms the plastic skin 24 must not be a solvent for the gel coating 22.

In a typical overdipping operation, there are three consecutive dips, ultimately resulting in a film thickness of between five and six thousandths of an inch for the skin 24. Between consecutive dipping steps, the plastic solution film is allowed to dry for intervals from 10 to 30 minutes at room temperature. After the final immersion in the overdipping solution, it takes about eight hours for final drying of the skin 24 at room temperature. The volatility of the tetrahydrofuran solvent helps keep this drying time from being longer.

At this point the product comprises the catheter shaft 10, with the viscous gel coating 22 still wet and still in place over the catheter shaft in the neighborhood of the inflation eye 20, with the dry balloon-forming plastic skin 24 in place over the lower end of the catheter shaft and over the gel coating 22.

The next step is to dry out the liquid solvent of the gel coating 22. This can be accomplished by additional drying time of eight to twelve hours at room temperature, or by a shorter drying time at elevated temperature. Still another method is to put the catheter assembly in an oven under vacuum for more rapid drying of the gel coating 22. Whichever drying process is used, the entrance to the inflation lumen 16 should be plugged while the drying takes place to keep a certain amount of back pressure within the lumen 16. This prevents the plastic film 24 from forcing some of the gel material 22 through the inflation eye 20 and into the inflation lumen 16 as the plastic skin 24 dries, with a certain amount of attendant shrinkage of the skin.

At the end of the drying process, the resulting product is as illustrated in FIG. 4. The liquid solvent portion of the gel coating 22 has evaporated, resulting in the decomposition of the gel coating. What remains on the surface of the catheter shaft 10 beneath the plastic skin 24 in the neighborhood of the inflation eye 20, is a solid residue 26 comprising the remaining solid gel agent plus some non-volatile glycerine, if that was one of the initial constituents of the gel coating 22.

It should be carefully noted that the drying step just described and the resulting product of FIG. 4 have a number of important advantages. First of all, the fully formed viscous gel coating 22, having served its purpose of interposing a physical barrier between the skin 24 and the catheter shaft 10 in the neighborhood of the inflation eye 20, now no longer remains to prevent inflation of the balloon formed by the plastic skin 24. Therefore, any suitable fluid can now be introduced immediately into the inflation lumen 16, emerging from the inflation eye 20 and distending the skin 24 so as to inflate the balloon as seen in FIG. 5. This enables the balloon of the catheter to be tested immediately after production by an air inflation test procedure, to determine whether the balloon functions satisfactorily. This has obvious advantages from a quality control point of view.

In the past, the materials used in place of the gel coating 22 to form a physical barrier between the skin 24 and the catheter shaft 10, were normally left in place until it was time to use the completed catheter. As a result, it was not possible to perform a quality control test upon the catheter until after it had been shipped from the factory and was in the hands of the ultimate user. In contrast, the present gel coating 22 is decomposed by the described drying process, and no longer interposes a barrier which would prevent air inflation of the balloon or skin 24. All that remains is the relatively insubstantial residue 26 comprising the gelling agent and, if desired, some glycerine as well. It will be appreciated that this solid residue 26 occupies a far smaller volume than the original gel coating 22, and has less mechanical strength. Therefore, it presents practically no physical resistance to the inflation of the balloon or skin 24.

In addition, the residue 26 comprises one, or in some cases, two materials which have excellent anti-block properties; i.e., the solid gelling agent residue and the glycerine left between the detached portion of the skin 24 and the catheter shaft 10 are both well suited to prevent sticking of the skin 24 to the underlying catheter shaft 10 in the region of the inflation eye 20. When such sticking occurs it becomes difficult or impossible to inflate the plastic balloon 24, thus defeating the urethral retention function and rendering the catheter inefficient for its intended use. It is an important additional advantage of the present invention that the residue 26 effectively overcomes this problem. The glycerine, when added to the gelling agent coating 22, is specifically for the purpose of functioning as an anti-block, and need not be used unless a blocking problem is encountered.

The gel coating 22 should be about 90 to 98% by weight of fugitive liquid (the solvent), from 1 to 3% by weight of solid gelling agent, and if desired as an antiblock, about 1 to 10% by weight of glycerine. Among the gelling agents mentioned, Carbopol and Methocel are soluble in water or a water-glycerine mixture, Baymal forms a colloidal dispersion in water which makes an aqueous gel, and an example of a non-aqueous gel system is aluminum stearate dissolved in toluene. The preferred formulation, however, is aqueous Carbopol with the pH adjusted to 7 by means of ammonium hydroxide or volatile amines mixed right into the gel, and optionally containing 5% glycerine as an anti-block.

If desired, a somewhat different approach to the problem of neutralization and viscosity control can be taken. This second approach involves the use of a more acid gel coating which is therefore substantially less viscous and easier to apply to the catheter shaft. For example, one may use gel with a low (acid) pH, resulting in greater ease of handling. When this approach is taken, the catheter shaft 10, and its more acid, less viscous gel coating 22 must subsequently be dipped into a solution containing an alkali neutralizing agent so that the gel coating 22 is neutralized to be made more viscous and therefore firmer so as to perform its physical barrier function. This can be accomplished in either one of two ways. The catheter shaft 10 with the more acid, less viscous gel coating 22 thereon, can be pre-dipped in a strong solution of alkali, such as an aqueous solution of concentrated ammonium hydrozide. Then the surface of the catheter shaft 10 which has been exposed to the strong alkali solution is allowed to dry, after which the overdipping step is performed as described above. The alkali pre-dip serves to thicken the gel coating 22 by neutralization and consequent increase of viscosity, so that it will satisfactorily perform its function during the subsequent overdipping step.

On the other hand, the plastic overdipping solution can contain sufficient volatile amines or ammonium hydroxide so that the alkali neutralization is inherently performed by the overdipping solution itself. Then the single overdipping step is all that is necessary for both neutralizing the gel coating 22 and formation of the plastic skin 24 simultaneously. The same multiple dip approach to overdipping would be employed as described above.

An example of a preferred formulation for a more acid, less viscous gel coating 22 is an aqueous Carbopol mixture with a pH of 2 containing from 5 to 10% by weight of glycerine as an anti-block. Alternatively, one can use a colloidal dispersion of Baymal in water with a pH ranging from 3 to 4. Subsequently, with either of these formulations, one would neutralize with an alkali material either before dipping or as part of the plastic overdip solution.

Although the present invention was developed specifically with the manufacture of all-plastic catheters in mind, and is particularly well adapted for that purpose, it has been found that the use of a gel coating barrier is not limited to plastic materials. In the manufacture of the older style latex rubber catheters a Carbopol aqueous acid gel or an aqueous Baymal colloidal dispersion gel can be used effectively for separating a latex rubber overskin, similar to the plastic skin 24 illustrated herein, from an underlying catheter shaft which is also made of a latex rubber material, but is otherwise similar to the plastic catheter shaft 10 illustrated in the present drawings.

A final step in the manufacture of the catheter is to punch or cut a drainage eye 28 (see FIG. 5) through the plastic skin 24 and the wall of the plastic catheter shaft 10 below the balloon area, to communicate with the drainage lumen 14 so that the catheter when in place can perform its drainage function.

Accordingly, it will now be appreciated that the present process provides a simple, convenient and economical way to manufacture and test an inflatable balloon type urethral retention catheter, and gives excellent assurance that the inflatable balloon sac will not adhere to the underlying surface of the catheter shaft.

Since the foregoing description and drawings are merely illustrative, the scope of protection of the invention has been more broadly stated in the following claims, and these should be liberally interpreted so as to obtain the benefit of all equivalents to which the inventor is fairly entitled.

What is claimed is:

1. The method of manufacturing a balloon type urethral retention catheter comprising the steps of forming a catheter shaft having at least an inflation lumen and an eye penetrating the wall of said catheter shaft to communicate with said lumen; putting a gel coating upon said catheter shaft in the neighborhood of said eye; overdipping said catheter shaft and gel coating in a solution of solid material dissolved in a liquid which is a non-solvent for said gel, to form a film over said gel coating and over the adjacent portions of said catheter shaft, which film subsequently dries to form a skin; and then decomposing said gel by drying, said gel consisting essentially of a gelling agent selected from the group consisting of a water-soluble resin, methyl cellulose, colloidal alumina, and aluminum stearate; and a solvent or dispersion agent for the particular gelling agent selected, said solvent or dispersion agent being at least one material selected from the group consisting of water, toluene, the alcohols, and methylene chloride.

2. The method of claim 1 wherein said gel incorporates pH-adjusting agents for increasing the viscosity thereof.

3. The method of claim 1 wherein said gel incorporates an alkali neutralizing agent for increasing the viscosity of said gel.

4. The method of claim 3 wherein said gel has a pH of about 7, said gelling agent is a water-soluble resin, said solvent is water, and said neutralizing agent is selected from the class consisting of ammonium hydroxide and at least one volatile amine.

5. The method of claim 4 wherein said gel includes in addition from about 5% to about 10% by weight of glycerine.

6. The method of claim 3 wherein said gel has a pH from about 6 to about 7, said gelling agent is colloidal alumina, and said dispersion agent is water.

7. The method of claim 1 wherein said gel coating when applied to said shaft has an acid pH for lower viscosity whereby to facilitate such application and further comprising the step of dipping said shaft with said low viscosity gel coating thereon into a bath containing an alkali neutralizing agent for increasing the viscosity of said gel coating not later than the time of said overdipping step.

8. The method of claim 7 wherein said gel coating comprises a gelling agent selected from the class consisting of a water-soluble resin and colloidal alumina and said neutralizing agent is a material selected from the class consisting of ammonium hydroxide and at least one volatile amine.

9. The method of claim 8 wherein said gel coating consists essentially of a water-soluble resin gelling agent, water as a solvent, from about 5% to about 10% by weight of glycerine, and has a pH of about 2.

10. The method of claim 8 wherein said gel coating consists essentially of a colloidal dispersion of alumina in water, and has a pH of from about 3 to about 4.

11. The method of claim 8 wherein said neutralizing bath is a strong solution of concentrated ammonium hydroxide.

12. The method of claim 8 wherein said overdip solution itself is the bath which contains said neutralizing agent.

References Cited

UNITED STATES PATENTS

| | | | |
|---|---|---|---|
| 3,277,227 | 10/1966 | Kesseler et al. | 264—213 X |
| 3,304,353 | 2/1967 | Harautuneian | 264—98 |

ROBERT F. WHITE, Primary Examiner

J. H. SILBAUGH, Assistant Examiner

U.S. Cl. X.R.

128—349; 156—155; 264—242, 264, 306